(12) United States Patent
Kumel et al.

(10) Patent No.: US 6,512,871 B2
(45) Date of Patent: Jan. 28, 2003

(54) DISPERSION COMPENSATING FIBER WITH VOID PATTERN IN SECONDARY CORE

(75) Inventors: Aladin H. Kumel, Cairo (EG); Aly F. Elrefaie, Cupertino, CA (US)

(73) Assignee: Gazillion Bits, Inc., San Jose, CA (US)

( * ) Notice: Subject to any disclaimer, the term of this patent is extended or adjusted under 35 U.S.C. 154(b) by 8 days.

(21) Appl. No.: 09/781,353

(22) Filed: Feb. 12, 2001

(65) Prior Publication Data

US 2002/0110340 A1 Aug. 15, 2002

(51) Int. Cl.⁷ .................................................. G02B 6/16
(52) U.S. Cl. .................... 385/123; 385/125; 385/127
(58) Field of Search ................................. 385/123, 124, 385/125, 126, 127, 128

(56) References Cited

U.S. PATENT DOCUMENTS

| | | | |
|---|---|---|---|
| 4,372,648 A | * 2/1983 | Black ....................... 350/96.33 |
| 5,155,792 A | 10/1992 | Vali et al. | |
| 5,471,553 A | 11/1995 | Teshima | |
| 5,802,236 A | 9/1998 | DiGiovanni et al. | |
| 5,822,488 A | 10/1998 | Terasawa et al. | |
| 5,878,182 A | 3/1999 | Peckham | |
| 5,907,652 A | 5/1999 | DiGiovanni et al. | |
| 5,936,762 A | 8/1999 | Samson et al. | |
| 5,973,823 A | 10/1999 | Koops et al. | |
| 5,995,695 A | 11/1999 | Aikawa et al. | |
| 6,075,915 A | 6/2000 | Koops et al. | |
| 6,078,715 A | * 6/2000 | Fujii et al. ................... 385/124 |
| 6,097,870 A | 8/2000 | Ranka et al. | |
| 6,418,258 B1 | * 7/2002 | Wang ......................... 385/125 |

OTHER PUBLICATIONS

Jopson, B., "Chromatic Dispersion Compensation and Measurement," Optical Fiber Communication Conference 2000 Proceeding, Baltimore, Maryland, TuC, (2000), pp. 1–28.

(List continued on next page.)

Primary Examiner—Akm E. Ullah
Assistant Examiner—Jennifer Doan
(74) Attorney, Agent, or Firm—Cooper & Dunham LLP

(57) ABSTRACT

An optical fiber having a strongly negative dispersion characteristic that is well suited for use as a dispersion compensating fiber is described. The optical fiber comprises a primary core, a primary cladding surrounding the primary core, a secondary core surrounding the primary cladding, and a secondary cladding surrounding the secondary core, wherein a plurality of voids is formed within the secondary core. The voids in the secondary core are elongated and run parallel to the fiber axis, and form a spatially periodic pattern when viewed in cross-section. In one preferred embodiment, the voids are circular and the spatially periodic void pattern comprises hexagonal unit cells having central members, whereby each void is the same distance from each of its six nearest neighbors. The optical fiber exhibits a strongly negative dispersion characteristic, thereby reducing the required length of dispersion compensating fiber per unit distance of optical fiber span.

24 Claims, 2 Drawing Sheets

OTHER PUBLICATIONS

Lively, John, "Dealing with the Problem of Chromatic Dispersion", Lightwave, Sep. 1998, pp. 1–6.

http://www.blazephotonics.com/pages/techn.htm—dated Mar. 30, 2001.

http://www.blazephotonics.com/pages/press.htm—dated Mar. 30, 2001.

U.S. patent application Ser. No. 09/781,341, filed Feb. 12, 2001.

U.S. patent application Ser. No. 09/781,343, filed Feb. 12, 2001.

Thyagarajan et al., "A Novel Design of a Dispersion Compensating Fiber," IEEE Photonics Technology Letters, vol. 8, No. 11, Nov. 1996.

Auguste et al., "−1800 ps/(nm.km) chromatic dispersion at 1.55 micrometer in jual concentric core fibre," Electronics Letter, vol. 36, No. 20 (Sep. 28, 2000) pp. 1689–1691.

Monroe et al., "Holey Optical Fibers: An Efficient Modal Model," IEEE Journal of Lightwave Technology, vol. 17, No. 6 (Jun. 1999), pp. 1093–1102.

Monroe et al., Modeling Large Air Fraction Holey Optical Fibers, IEEE Journal of Lightwave Technology, vol. 18, No. 1 (Jan. 2000), pp. 50–56.

Richardson, D.J., Monro, T.M., Broderick, N.G.R., "Holey Fibers—A Review of Recent Developments in Theory, Fabrication, and Experiment".

Bennett, P.J., Monroe, T.M., Richardson, D.J., "Towards Practical Holey Fiber Technology: Fabrication, Splicing, Modeling, and Characterization," Optics Letters 24, pp. 1203–1205 (1999).

Antos, A. Joseph and Smith, David K., "Design and Characterization of Dispersion Compensating Fiber Based on the LP01 Mode," IEEE Journal of Lightwave Tehcnology, vol. 12, No. 10 (Oct. 1994), pp. 1739–1745.

Srikant et al., "Design and Fabrication of Ultrabroad Band Dispersion Compensating Fibers for WDM Operations", National Fiber Optics Engineers Conference (Sep. 1999).

Ten et al., "Optimized Dispersion Compensating Fiber for C–and L–Band 10 GBits/s WDM Systems over Standard SMF", a paper given by Corning representatives at AMTC, (Jul. 1999).

* cited by examiner

DISPERSION COMPENSATING FIBER WITH VOID PATTERN IN SECONDARY CORE

FIELD

This patent specification relates to the field of optical fibers. More particularly, it relates to an optical fiber having a strongly negative dispersion characteristic that is advantageous for use as a dispersion compensating fiber.

BACKGROUND

As the world's need for communication capacity continues to increase, the use of optical signals to transfer large amounts of information has become increasingly favored over other schemes such as those using twisted copper wires, coaxial cables, or microwave links. Optical communication systems use optical signals to carry information at high speeds over an optical path such as an optical fiber. Optical fiber communication systems are generally immune to electromagnetic interference effects, unlike the other schemes listed above. Furthermore, the silica glass fibers used in fiber optic communication systems are lightweight, comparatively low cost, and are able to carry tens, hundreds, and even thousands of gigabits per second across substantial distances.

A conventional optical fiber is essentially an optical waveguide having an inner core and an outer cladding, the cladding having a lower index of refraction than the core. Because of the difference in refractive indices, the optical fiber is capable of confining light that is axially introduced into the core and transmitting that light over a substantial distance. Conventional optical fibers have a solid cross-section and are made of fused silica, with the core region and the cladding region having different levels of dopants (introduced impurities) to result in the different indices of refraction. The cladding is usually doped to have a refractive index that ranges from 0.1% (single mode fibers) to 2% (multi-mode fibers) less than the refractive index of the core, which itself usually has a nominal refractive index of 1.47.

As known in the art, single-mode fiber is preferred over multi-mode fiber for high-capacity, long-distance optical communications. Single-mode fiber prevents electromagnetic waves from traveling down in the fiber in anything but a single, tightly held mode near its center axis. This is in contrast to multi-mode fiber, in which incident electromagnetic waves may travel down the fiber over several paths of differing distances. Accordingly, single-mode fiber allows for reduced group delay, and thereby allows optical signals to better keep their shape as they travel down the fiber. Conventional single-mode fibers have a core diameter of about 9 $\mu$m and a cladding diameter of about 125 $\mu$m, and are single-mode down to a cutoff wavelength of about 1100 nm, below which they become multi-mode.

Chromatic dispersion is one of the adverse effects suffered by conventional single-mode optical fibers. Dispersion is generally a loss of signal shape as different component wavelengths travel down the fiber at different speeds. Dispersion effects serve to reduce the rate at which a light beam at a given wavelength $\lambda_i$ may be modulated with information (thereby reducing system throughput), and to reduce the required spacing between regenerators in a fiber optic communications link (thereby increasing system cost).

FIG. 1 shows a dispersion characteristic 100 for a conventional single-mode silica glass optical fiber versus wavelength, for wavelengths between 1300 nm and 1600 nmn. See Jopson, B., "Chromatic Dispersion Compensation and Measurement," *Optical Fiber Communication Conference* 2000 *Proceedings,* Baltimore, Md., TuC, pp. 1–28, (2000), which is incorporated by reference herein. Dispersion is commonly expressed in ps/(nm-km) and, as shown in FIG. 3, varies with wavelength. Where the dispersion is positive, longer component wavelengths tend to fall behind the shorter component wavelengths as a signal travels down the fiber. Where the dispersion is negative, shorter component wavelengths tend to fall behind the longer ones. As shown in FIG. 1, dispersion is positive in the commonly-used wavelength range of 1500 nm–1600 nm, ranging from approximately 14 ps/(nm-km) at 1500 nm to 20 ps/(nm-km) at 1600 nm.

As described in Hecht, supra at pp. 96–97, the usefulness of dispersion-compensating fibers arises out of the principle that fibers with opposite signs of chromatic dispersion can be serially combined to yield low overall dispersion. Dispersion-compensating fibers are characterized by a strongly negative dispersion characteristic. For optical fiber links operating in the 1500–1600 nm range, where the conventional fiber optic span dispersion is positive, these dispersion-compensating fibers are placed in series with the fiber span at regular intervals. As used herein, the term "fiber span" shall denote those portions of conventional single-mode optical fiber between which the dispersion-compensating fiber loops are interposed. Generally speaking, after a signal passes through a fiber span having positive dispersion in which the longer wavelengths fall behind the shorter ones, the dispersion-compensating fiber section causes the longer wavelengths to "catch up" with the shorter ones to cancel the dispersion effect.

One commonly used dispersion-compensating fiber comprises a single narrow core (about 2.2 $\mu$m) that is heavily doped in the positive index direction ($\Delta n=+4\%$), surrounded by a cladding region that is more lightly doped in the negative index direction ($\Delta n=-0.7\%$). See Jopson, supra at p. 25. However, conventional dispersion compensating fibers have dispersions of only about $-100$ ps/(nm-km) to $-200$ ps(nm-km), and therefore a substantial amount of dispersion compensating fiber is required per unit distance of optical fiber span. Thus, for example, for every 100 km of fiber span having a dispersion of +20 ps/km-nm, there would need to be 20 km of dispersion-compensating fiber having a dispersion of $-100$ ps/km-nm. The need to place a 20 km loop of dispersion-compensating fiber for every 100 km of fiber span introduces unwanted costs in the construction of a fiber optics communications link.

Disadvantageously, because dispersion compensating fibers are optimized for dispersion rather than attenuation, they typically have substantial attenuations of about 0.5 dB/km. Thus, the 20 km dispersion compensating fiber of the above example introduces a large amount, about 10 dB, of attenuation. Further, this additional attenuation is often compensated for by increasing the amplification of optical amplifiers in the communications link, which increases noise in the transmitted signal. Additionally, the dispersion characteristic of conventional dispersion compensating fibers tends to be rather flat between 1500 and 1600 $\mu$m, whereas a more effective dispersion compensating fiber would have a dispersion characteristic that is closer to a scaled negative mirror image of the dispersion characteristic of the fiber span. Thus, for example, where the fiber span has a roughly linear increase from 14 ps/(nm-km) to 20 ps/(nm-km) (about a 43% increase) between 1500 nm and 1600 nm, an effective dispersion compensating fiber would have a concomitant decrease of 43% (i.e., becomes 43% more negative) across this same wavelength range.

Proposals have been made for dispersion compensating fibers having stronger negative dispersion characteristics. One proposal is described in Thyagarajan et al, "A Novel Design of a Dispersion Compensating Fiber," IEEE Photonics Technology Letters, Vol. 8, No. 11, (November 1996) (hereinafter "Thyagarajan"), which is incorporated by reference herein. The Thyagarajan fiber comprises a dual-core design comprising an inner core of radius a and refractive index $n_1$, an inner cladding surrounding the inner core having an outer radius b and refractive index $n_3$, an outer core surrounding the inner core having an outer radius c and refractive index $n_2$, and an outer cladding surrounding the outer core having a refractive index of $n_3$ and extending out to the rest of the radius of the fiber. The fiber is characterized as highly asymmetric in that the refractive index difference between the inner core and the cladding (about 2%) is many times greater than the refractive index difference between the outer core and the cladding (about 0.2%).

While the Thyagarajan fiber is capable of reaching a very strong negative dispersion of about −5000 ps/(nm-km), it only reaches this value for a very small band of wavelengths about 5–10 nm wide. One form of the Thyagarajan fiber, for example, reaches −5000 ps/(nm-km) at 1.55 $\mu$m, but is only −500 ps/(nm-km) at the immediately neighboring wavelengths of 1.54 $\mu$m and 1.56 $\mu$m. This notch-like characteristic makes the fiber less useful in practical applications, where a more consistent dispersion characteristic approximating a scaled negative mirror image of the fiber span dispersion characteristic is needed.

Accordingly, it would be desirable to provide an optical fiber having a strongly negative dispersion characteristic across a substantial range of wavelengths.

It would be further desirable to provide an optical fiber have a dispersion characteristic that is closer to a negative mirror of the dispersion characteristic of a conventional single-mode optical fiber, for providing enhanced dispersion compensation of signals propagated along a conventional single-mode optical fiber span.

It would be even further desirable to provide a dispersion compensating fiber having a shorter required length per unit distance of optical fiber span, for lowering system costs and reducing attenuation caused by dispersion compensating fiber.

SUMMARY

In accordance with a preferred embodiment, an optical fiber is provided comprising a primary core, a primary cladding surrounding the primary core, a secondary core surrounding the primary cladding, and a secondary cladding surrounding the secondary core, wherein a plurality of voids is formed within the secondary core. The voids in the secondary core are elongated and run parallel to the fiber axis, and form a spatially periodic pattern when viewed in cross-section. The spatially periodic void pattern is characterized by at least one pitch parameter representing distances between each void and its neighbors. According to a preferred embodiment, the pitch parameter is greater than or equal to approximately one wavelength of light being propagated, and each void has a dimension that is substantially less than the pitch parameter. In one preferred embodiment, the voids are circular and the spatially periodic void pattern comprises hexagonal unit cells having central members, whereby each void is the same distance from each of its six nearest neighbors. Preferably, the refractive index difference between the primary core and the primary cladding is several times greater than the refractive index difference between the secondary core and the primary cladding. The secondary cladding has an index of refraction substantially equal to that of the primary cladding.

An optical fiber in accordance with the preferred embodiments exhibits a strongly negative dispersion characteristic, thereby reducing the required length of dispersion compensating fiber per unit distance of optical fiber span. This lowers system costs and reduces attenuation caused by the dispersion compensating fiber. Furthermore, the dispersion characteristic more closely approximates a scaled negative mirror image of the dispersion characteristic of a conventional fiber span, thereby providing improved dispersion compensation performance.

DETAILED DESCRIPTION

Figure 1:
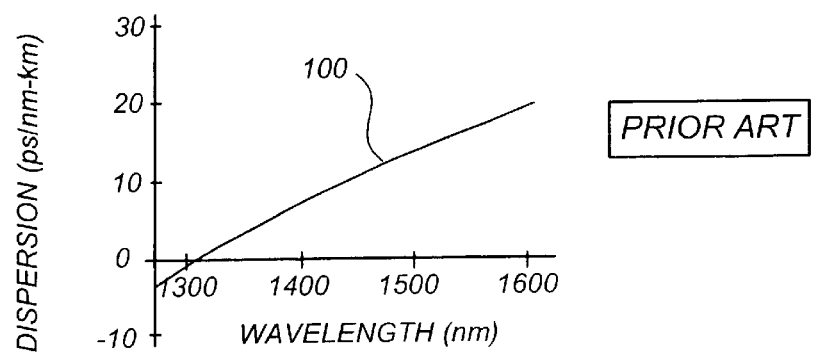
FIG. 1 illustrates a dispersion characteristic of a conventional single-mode fiber optic span.
Figure 2:
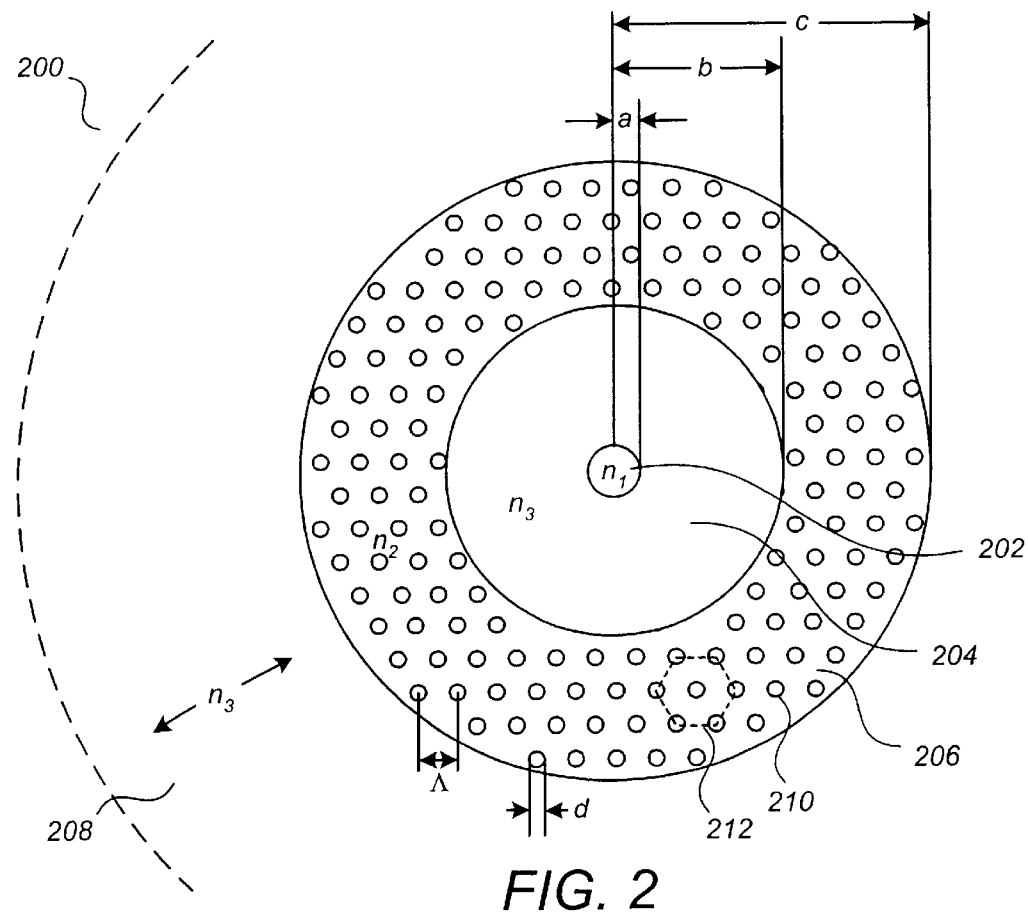
FIG. 2 illustrates a cross-section of a dispersion-compensating fiber in accordance with a preferred embodiment.

FIG. 2 illustrates a cross-section of an optical fiber 200 in accordance with a preferred embodiment that is for use as a dispersion compensating fiber. Optical fiber 200 comprises a primary or inner core 202, a primary or inner cladding 204 surrounding the inner core 202, a secondary or outer core 206 surrounding the inner cladding 204, and a secondary or outer cladding 208 surrounding the outer core 206. Inner core 202 has an index of refraction $n_1$ that is higher than an index of refraction $n_3$ of the inner cladding 204. Outer cladding 208 has an index of refraction that is preferably the same as that of the inner cladding 204, and therefore the index of refraction of both shall be denoted by $n_3$ herein. Outer core 206 comprises an optical material having an index of refraction $n_2$ that is also higher than the index of refraction $n_3$ of the inner and outer claddings 204 and 208.

According to a preferred embodiment, the refractive index difference ($n_1-n_3$) between the inner core and the cladding is several times greater than the refractive index difference ($n_2-n_3$) between the material of the outer core 206 and the cladding. In one preferred embodiment, the relation of Eq. (1) below is preferable:

$$(n_1-n_3)=K(n_2-n_3), K>2 \qquad \{1\}$$

In another preferred embodiment, K is approximately equal to 10. In another preferred embodiment, the inner core 202 may have a parabolic refractive index profile, with an index of refraction equal to $n_1$ at its center that parabolically decreases to $n_3$ at its outer perimeter. In general, it is the refractive index differences between the layers that affects the dispersion characteristic of optical fiber 200 more than the absolute values of the refractive indices of the layers themselves, and therefore a variety of values for cladding index $n_3$ would be within the scope of the preferred embodiments. One value that has been found to produce good results is an $n_3$ value of approximately 1.444. Also, a variety of values for $n_1$ and $n_2$ could readily be selected by a person skilled in the art in light of the present disclosure to produce a desirable dispersion characteristic, subject to the guidance of Eq. (1). One set of values that has been found to produce good results is $n_1=(\sqrt{1.04})n_3$ and $n_2=(\sqrt{1.006})n_3$.

As indicated in FIG. 2, inner core 202 has a radius a, inner cladding 204 is an annulus of width b-a, outer core 206 is an annulus of width c-b, and outer cladding 208 is an annulus having an inner radius of c and an outer radius consistent with conventional single-mode cladding radii, e.g., 40 µm-62.5 µm. While a variety of values for a, b, and c could readily be selected by a person skilled in the art in light of the present disclosure to produce a desirable dispersion characteristic, values of a=1.0197 µm, b=a+14.2 µm, and c=b+6.8 µm are found to produce a desirable dispersion characteristic when used in conjunction with the above indices of refraction.

According to a preferred embodiment, outer core 206 is structured such that a spatially periodic pattern of voids 210 is formed therein when viewed in cross-section, as shown in FIG. 2. Voids 210 are elongated and run parallel to the axis of the optical fiber 200, preferably for its entire length. The voids 210 have a diameter of d and are separated by a pitch value $\Lambda$, as shown in FIG. 2. It is generally preferred that the inner and outer cladding regions comprise solid material without voids.

It has been found that, in order to achieve a strongly negative dispersion characteristic, there needs to be imposed on a dispersion-compensating fiber a very fast change in its propagation constant β over the entire desired wavelength interval. At least in part, this is due to the fact that the second derivative of the propagation constant β with respect to wavelength is related to the dispersion value at a given wavelength. The propagation constant β, as accepted in the art, is related to the electric and magnetic fields of the propagating wave according to Eqs. (2) and (3) below, where a cylindrical coordinate system $\{r, \varnothing, z\}$ is used and z is parallel to the axis of the optical fiber:

$$E = E_0(r,\varnothing)e^{i(\omega t - \beta z)} \quad \{2\}$$

$$H = H_0(r,\varnothing)e^{i(\omega t - \beta z)} \quad \{3\}$$

In accordance with the preferred embodiments, it has been found that placing a spatially periodic pattern of voids in the outer core 206 permits a large change in the propagation constant β over a substantial interval, for example 50–100 nm wide, such that strongly negative dispersion values are experienced across the entire interval. Furthermore, values for void diameter $\Lambda$ and void pitch $\Lambda$ may be selected (along with core/cladding sizes and material refractive indices) such that the dispersion characteristic of the optical fiber 200 approximates a scaled negative mirror image of the dispersion characteristic of the fiber span, thereby providing ideal dispersion compensation characteristics.

According to a preferred embodiment, it has been found that circular air voids arranged in a periodically repeated hexagonal void pattern having a center member allows for the production of a desirable dispersion characteristic for the optical fiber 200. For clarity of disclosure, one such hexagonal cell with a center member is shown in dotted outline form as element 212 in FIG. 2. As can be seen from FIG. 2, the pitch $\Lambda$ represents the spacing between each void 210 and each of its six immediately neighboring voids. If other spatially periodic patterns of voids are used, the pitch $\Lambda$ may represent the distance between each void and its closest neighbors, or may represent the average spacing between voids. In some cases, multiple pitch parameters $\Lambda_1$, $\Lambda_2$, etc. may be required to properly characterize the spatially periodic void patterns.

The design of the optical fiber 200 in accordance with the preferred embodiments may be carried out for different desired dispersion curves through iterative computer simulation techniques, as is commonly performed in many optical fiber designs. Computer simulation generally involves solution of vector Maxwell's equations by finite element techniques, yielding the optical vector fields in a region of interest, and thus yielding sufficient information about overall optical propagation in the fiber. A starting set of parameters (a, b, c, $n_1$, $n_2$, $n_3$, d, and $\Lambda$), as well as void pattern geometry, are selected and a dispersion characteristic computed for that parameter set. One or more parameters are incrementally changed and the next dispersion characteristic is computed, and so on, until a desired set of parameters is determined.

Generally speaking, it is preferable that the void pitch $\Lambda$ be approximately equal or greater than the center wavelength $\lambda_c$ of the range of light wavelengths being propagated. Also generally speaking, it is preferable that the diameter d of the voids be only a fraction of the void pitch $\Lambda$, usually 0.5$\Lambda$ or less. While a variety of values for void pitch $\Lambda$ and void diameter d could readily be selected by a person skilled in the art in light of the present disclosure to produce a desirable dispersion characteristic, values of $\Lambda = \lambda_c = 1.55$ µm and d=0.3$\Lambda$ are found to produce a desirable dispersion characteristic when used in conjunction with the above core/cladding sizes and material refractive indices.

Figure 3:
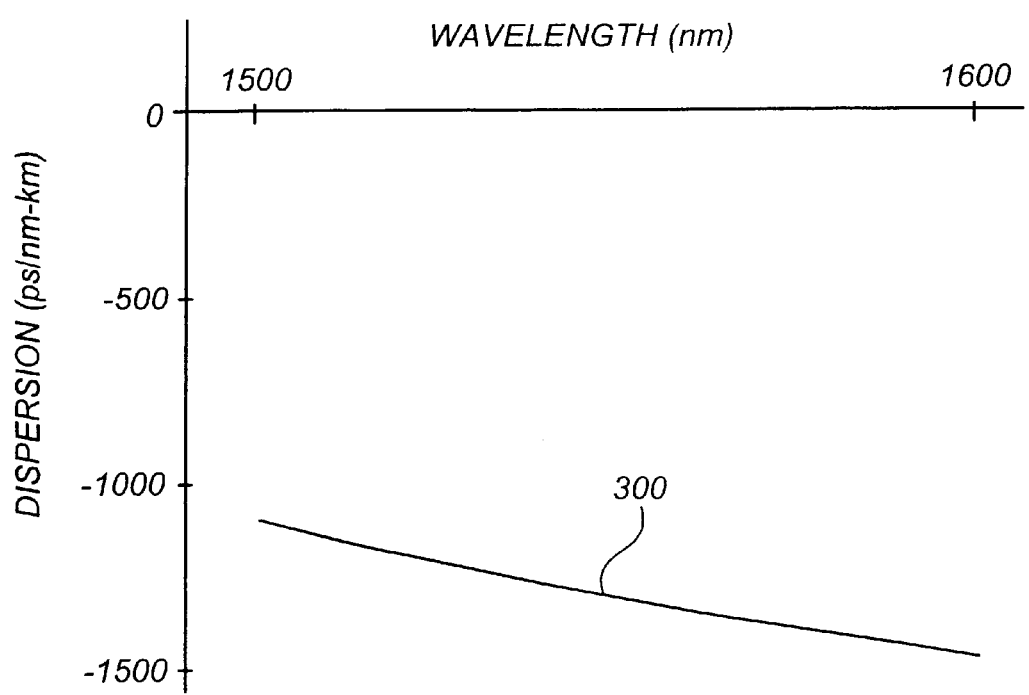
FIG. 3 illustrates a dispersion plot for the dispersion-compensating fiber of FIG. 2.

FIG. 3 illustrates a dispersion characteristic 300 of an optical fiber 200 in accordance with a preferred embodiment. The parameters a=1.0197 µm, b=a+14.2 µm, and c=b+6.8 µm, $n_1 = (\sqrt{1.04})n_3$, $n_2 = (\sqrt{1.006})n_3$, $n_3 = 1.444$, $\Lambda = 1.55$ µm, and d=0.3$\Lambda$ along with a periodic hexagonal pattern of voids with a center member, were used for the optical fiber 200 in generating the dispersion characteristic 300. Dispersion characteristic 300 is strongly negative and also approximates a scaled negative mirror image of the dispersion characteristic 100 of the fiber span to which it will be coupled. It has been found that using a different parameter set in which $\Lambda = 5\lambda_c = 7.75$ µm, and d=0.28 $\Lambda$ also yields a dispersion curve similar to the dispersion characteristic 300 of FIG. 3.

Dispersion characteristic 300 has a value of −1100 ps/(nm-km) at 1500 nm, and is monotonic and roughly linear down to a value of −1470 ps/(nm-km) at 1600 nm. Thus, the optical fiber 200 has a dispersion value that becomes about 33% more negative over the 1500–1600 nm interval, which represents improved closeness to a negative mirror image of the conventional fiber span (having a 43% increase over the same interval), and which will therefore provide improved dispersion compensation performance. Additionally, with such a dispersion characteristic, only 1.36 km of dispersion compensating fiber would be needed for every 100 km of fiber span having a dispersion of +20 ps/(nm-km). Compared to the common dispersion compensating fiber described supra in which 20 km would be required, this represents a substantial cost savings as well as reducing the amount of added attenuation from about 10 dB to about 0.7 dB per 100 km of fiber span.

Optical fiber 200 may be fabricated using any method capable of generating the successive differently-doped layers shown in FIG. 2 as well as forming the void regions in the outer core 206, preferably to a high degree of precision and consistency in the void size and spacing. Fabrication methods known in the art associated with photonic bandgap (PBG) fibers, "holey" fibers, or as described in U.S. Pat. No. 5,802,236, which is incorporated by reference herein, may be used. See Richardson, D. J., Monro, T. M., Broderick, N. G. R., "Holey Fibers—A Review of Recent Developments in Theory, Fabrication, and Experiment;" Bennett, P. J., Monro, T. M., Richardson, D. J., "Towards Practical Holey Fiber Technology: Fabrication, Splicing, Modeling, and Characterization," Optics Letters 24, pp. 1203–1205 (1999), which are incorporated by reference herein. Alternatively, fabrication methods may be adapted that are described in Ser. Nos. 09/781,343 and 09/781,341, which are incorporated by reference herein.

Whereas many alterations and modifications of the present disclosure will no doubt become apparent to a person of ordinary skill in the art after having read the foregoing description, it is to be understood that the particular embodiments shown and described by way of illustration are in no way intended to be considered limiting. For example, although the void diameters were a constant single value in the above examples, it would be within the scope of the preferred embodiments to select periodic patterns of different void diameters, and to determine preferred values based on an iterative solving of Maxwell's equations for the different size values. Likewise, although a hexagonal void pattern with a center member is used in the above examples, it would be within the scope of the preferred embodiments to select other types of periodic patterns (e.g., squares, pentagons, octagons, etc.) and to determine which other periodic patterns based on an iterative solving of Maxwell's equations for different parameters for the different types of patterns. As an additional example, while the voids described supra are filled with air, it would be within the scope of the preferred embodiments for the voids to be vacuum or to be filled with an inert gas, a liquid, or a solid having a distinct refractive index from the surrounding material. Even further, while the design figures disclosed supra yield strongly negative dispersions around −1500 ps/(nm-km) at 1600 nm, a set of design figures yielding an even stronger negative dispersion characteristic around −5000 ps/(nm-km) at 1600 nm would be within the scope of the preferred embodiments. With such a dispersion characteristic, only 0.4 km of dispersion compensating fiber would be needed for every 100 km of fiber span having a dispersion of +20 ps(nm-km). Therefore, reference to the details of the preferred embodiments are not intended to limit their scope, which is limited only by the scope of the claims set forth below.

What is claimed is:

1. An optical fiber, comprising:
   a primary core region comprising a primary core material;
   a primary cladding region surrounding said primary core region, said primary cladding region comprising a primary cladding material having an index of refraction less than that of said primary core material;
   a secondary core region surrounding said primary cladding region; and
   a secondary cladding region surrounding said secondary core region;
   wherein said secondary core region comprises a plurality of elongated voids running parallel to an axis of the optical fiber, said voids forming a spatially periodic pattern when viewed in cross-section.

2. The optical fiber of claim 1, wherein said spatially periodic pattern is characterized in that each void is positioned an identical distance from each of its nearest neighbors.

3. The optical fiber of claim 2, wherein said spatially periodic pattern comprised hexagonal units cells having central members.

4. The optical fiber of claim 3, said spatially periodic pattern being characterized by a pitch parameter corresponding to a distance between each void and its nearest neighbors, wherein said pitch parameter is greater than or equal to a wavelength of light being propagated by the optical fiber.

5. The optical fiber of claim 4, wherein said voids have a dimension that is no greater than one-half of said pitch parameter.

6. The optical fiber of claim 1, said secondary core comprising a secondary core material, wherein a refractive index difference between said primary core material and said primary cladding material is at least twice as great as a refractive index difference between said secondary core material and said primary cladding material.

7. The optical fiber of claim 6, wherein said refractive index difference between said primary core material and said primary cladding material is about 10 times as great as said refractive index difference between said secondary core material and said primary cladding material, and wherein said voids comprise air or vacuum.

8. The optical fiber of claim 1, wherein said optical fiber has a dispersion more strongly negative than −1000 ps/(nm-km) for each wavelength between 1500 nm and 1600 nm.

9. The optical fiber of claim 1, said spatially periodic pattern being characterized by a pitch parameter corresponding to a distance between each void and its nearest neighbors, wherein said pitch parameter is greater than or equal to a wavelength of light being propagated by the optical fiber.

10. The optical fiber of claim 9, wherein said voids have a dimension that is no greater than one-half of said pitch parameter.

11. A dispersion-compensating fiber, comprising:
    an inner core;
    a solid inner cladding surrounding said inner core; and
    an outer core surrounding said inner cladding, said outer core comprising a pattern of voids;
    wherein said voids are configured and dimensioned such that said dispersion-compensating fiber has a negative, monotonic dispersion characteristic across a wavelength range of at least 50 nm.

12. The dispersion-compensating fiber of claim 11, further comprising a solid outer cladding surrounding said outer core, said outer cladding having a refractive index substantially equal to a refractive index of said inner cladding.

13. The dispersion-compensating fiber of claim 11, said outer core comprising an outer core material, wherein a refractive index difference between said inner core and said inner cladding is at least twice as great as a refractive index difference between said outer core material and said inner cladding.

14. The dispersion-compensating fiber of claim 11, wherein said void pattern is a spatially periodic pattern when viewed in cross-section, said spatially periodic pattern being characterized by a pitch parameter corresponding to a distance between each void and its nearest neighbors, wherein said pitch parameter is greater than or equal to a wavelength of light being propagated by the optical fiber.

15. The dispersion-compensating fiber of claim 14, wherein said voids have a dimension that is no greater than one-half of said pitch parameter.

16. The dispersion-compensating fiber of claim 15, wherein said voids are circular and wherein said spatially periodic pattern comprises hexagonal units cells having central members.

17. The dispersion-compensating fiber of claim 16, wherein said wavelength lies between 1500 nm and 1600 nm, wherein said outer core comprises an outer core material, wherein a refractive index difference between said inner core and said inner cladding is approximately ten times as great as a refractive index difference between said outer core material and said inner cladding, wherein said pitch parameter is set equal to the wavelength, and wherein said voids have a diameter set equal to 0.3 times the pitch parameter, whereby said dispersion-compensating fiber has a dispersion more strongly negative than −1000 ps/(nm-km) for all points between 1500 nm and 1600 nm.

18. The dispersion-compensating fiber of claim 11, wherein said voids are circular and wherein said spatially periodic pattern comprises hexagonal units cells having central members.

19. A method of making a dispersion-compensating fiber, comprising the steps of:
forming an inner core of an inner core material;
forming an inner cladding around said inner core, said inner cladding comprising an inner cladding material having an index of refraction less than an index of refraction of said inner core material;
forming an outer core surrounding said inner cladding; and
and forming elongated voids in said outer core, said voids being configured and dimensioned such that a propagation constant of the dispersion-compensating fiber exhibits substantial variations between a lower wavelength and an upper wavelength, and wherein a resulting dispersion characteristic of said dispersion-compensating fiber is strongly negative between said lower wavelength and an upper wavelength.

20. The method of claim 19, wherein said lower wavelength is approximately 1500 nm, wherein said upper wavelength is approximately 1600 nm, and wherein said strongly negative dispersion characteristic is more negative than −1000 ps/(nm-km) between said lower and upper wavelengths.

21. The method of claim 20, wherein said strongly negative dispersion characteristic is monotonic and becomes more negative between 1500 nm and 1600 nm by an amount greater than 25% and less than 50%.

22. The method of claim 19, wherein said voids form a spatially periodic pattern when viewed in cross-section, said spatially periodic pattern being characterized by a pitch parameter corresponding to a distance between each void and its nearest neighbors, wherein said pitch parameter is greater than or equal to a wavelength of light being propagated by the optical fiber.

23. The method of claim 22, wherein said voids have a dimension that is no greater than one-half of said pitch parameter.

24. The method of claim 19, wherein said voids are circular and form a spatially periodic pattern when viewed in cross-section, said spatially periodic pattern comprising hexagonal units cells having central members.

* * * * *

UNITED STATES PATENT AND TRADEMARK OFFICE
CERTIFICATE OF CORRECTION

PATENT NO.    : 6,512,871 B2
DATED         : February 12, 2001
INVENTOR(S)   : Kamel et al.

It is certified that error appears in the above-identified patent and that said Letters Patent is hereby corrected as shown below:

<u>Title page,</u>
Item [75], Inventors, "Aladin H. Kumel" should read -- Aladin H. Kamel --.

Signed and Sealed this

Twenty-fourth Day of June, 2003

JAMES E. ROGAN
*Director of the United States Patent and Trademark Office*